(12) United States Patent
Eilts et al.

(10) Patent No.: US 7,333,788 B2
(45) Date of Patent: Feb. 19, 2008

(54) METHOD FOR CALIBRATING AUTOMATIC GAIN CONTROL IN WIRELESS DEVICES

(75) Inventors: Henry S. Eilts, Plano, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 508 days.

(21) Appl. No.: 10/735,380

(22) Filed: Dec. 12, 2003

(65) Prior Publication Data

US 2005/0009483 A1 Jan. 13, 2005

Related U.S. Application Data (60) Provisional application No. 60/434,848, filed on Dec. 20, 2002.

(51) Int. Cl.
*H04B 17/02* (2006.01)
*H04B 1/06* (2006.01)

(52) U.S. Cl. ............... 455/136; 455/234.1; 455/226.1

(58) Field of Classification Search ............... 455/136, 455/138, 232.1, 250.1, 251.1, 127.1, 127.2, 455/226.1, 522, 226.3, 423, 101, 103, 278.1, 455/276.1, 234.1, 252.1; 375/260, 325, 267, 375/299, 345; 342/174; 370/338, 241, 210, 370/437

See application file for complete search history.

(56) References Cited

U.S. PATENT DOCUMENTS

| | | | |
|---|---|---|---|
| 6,735,422 B1* | 5/2004 | Baldwin et al. | 455/232.1 |
| 7,031,669 B2* | 4/2006 | Vaidyanathan et al. | 455/84 |
| 2004/0082356 A1* | 4/2004 | Walton et al. | 455/522 |
| 2004/0085939 A1* | 5/2004 | Wallace et al. | 370/335 |
| 2004/0106381 A1* | 6/2004 | Tiller | 455/73 |
| 2004/0120411 A1* | 6/2004 | Walton et al. | 375/260 |
| 2004/0198276 A1* | 10/2004 | Tellado et al. | 455/132 |
| 2004/0252632 A1* | 12/2004 | Bourdoux et al. | 370/210 |
| 2005/0047384 A1* | 3/2005 | Wax et al. | 370/338 |
| 2005/0128953 A1* | 6/2005 | Wallace et al. | 370/241 |
| 2005/0135403 A1* | 6/2005 | Ketchum et al. | 370/437 |
| 2006/0239370 A1* | 10/2006 | Mody et al. | 375/260 |

* cited by examiner

*Primary Examiner*—Quochien B. Vuong
(74) *Attorney, Agent, or Firm*—Steven A. Shaw; W. James Brady; Frederick J. Telecky, Jr.

(57) ABSTRACT

Disclosed herein is an iterative process for calibrating an AGC in a wireless system, wherein the iterative process includes transmitting a calibration signal, receiving the calibration signal, decoding the calibration signal to produce a measurement, storing the measurement and changing an AGC gain setting.

23 Claims, 5 Drawing Sheets

METHOD FOR CALIBRATING AUTOMATIC GAIN CONTROL IN WIRELESS DEVICES

PRIORITY CLAIM

This application claims priority to U.S. Provisional Patent Application Ser. No. 60/434,848, filed on Dec. 20, 2002, entitled "Method For Calibrating the Receive AGC In A Multichannel Communications Transceiver," incorporated herein by reference.

BACKGROUND

The invention disclosed herein relates to wireless networks. More specifically, the invention relates to calibrating the automatic gain control ("AGC") of a receiver in a wireless device.

Wireless local area networks ("WLAN") allow electronic devices, such as computers, to have network connectivity without the use of wires. Network connections may be established via, for example, radio signals. Connections with existing wired networks may be provided by a wireless access point ("AP") having a wired Internet or Ethernet connection and radio communication circuitry capable of transmitting data to and receiving data from any compatible wireless device. The AP may provide Internet and/or network connectivity to such wireless devices (e.g., portable computers) called receiver stations ("STA") by transmitting and receiving data via radio signals.

Data signals transmitted from an AP to a STA or from a STA to an AP may vary in quality and strength. For example, an AP and a STA situated in relatively close proximity may achieve a strong communication signal, whereas an AP and a STA with a relatively large physical distance therebetween may achieve a weak communication signal. Depending on the quality of the signal received, a STA or an AP may use an AGC to amplify the received signal to a magnitude and phase suitable for analog-to-digital conversion. The AGC may automatically adjust the amount of gain based on signal characteristics. For instance, a greater gain may be applied to a weak received signal whereas a lesser gain may be applied to a strong received signal. In this manner, the AGC can consistently provide an analog-to-digital converter ("ADC") with received signals of similar or identical strength, regardless of the strength of the signals received. Such use of an AGC permits use of the full dynamic range of the ADC.

Regular calibration of the AGC may provide wireless communication systems with enhanced performance. That is, it may be desirable to determine how the signal gain varies for different settings of the AGC. Certain hardware may be implemented in a STA or an AP to accomplish AGC calibration; however, additional hardware may be unacceptable due to, among other things, an increase in production cost. Thus, a technique to calibrate the AGC without the use of additional hardware is desirable.

BRIEF SUMMARY

Accordingly, there is disclosed herein a method for calibrating an AGC in a wireless device. In one embodiment, the method comprises transmitting a calibration signal, receiving the calibration signal, decoding the calibration signal to produce a measurement, storing the measurement and changing an AGC gain setting.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. The embodiments described herein may be provided in the context of IEEE 802.11 compliant devices, but other wireless protocols, now known or later developed, may be used as well. Furthermore, the embodiments described herein may be implemented in the context of multiple-input, multiple-output ("MIMO") signaling systems, but other signal systems also may be used.

In a MIMO signaling system, the rate at which data is transferred ("data rate") between an access point ("AP") and a wireless device ("STA") may be raised by increasing the number of antennas and transmitter/receiver modules ("transceivers") associated with each wireless device in the system. For instance, a system having an AP with multiple antennas and transceivers and an STA with multiple antennas and transceivers may have a higher data rate than a system having an AP with a single antenna/transceiver and an STA with a single antenna/transceiver. The multiple antennas and transceivers are part of a design that attempts to achieve a linear increase in data rate as the number of transmitting and receiving antennas increases. The calibration technique described herein may be applied to any wireless MIMO system.

Figure 1A:
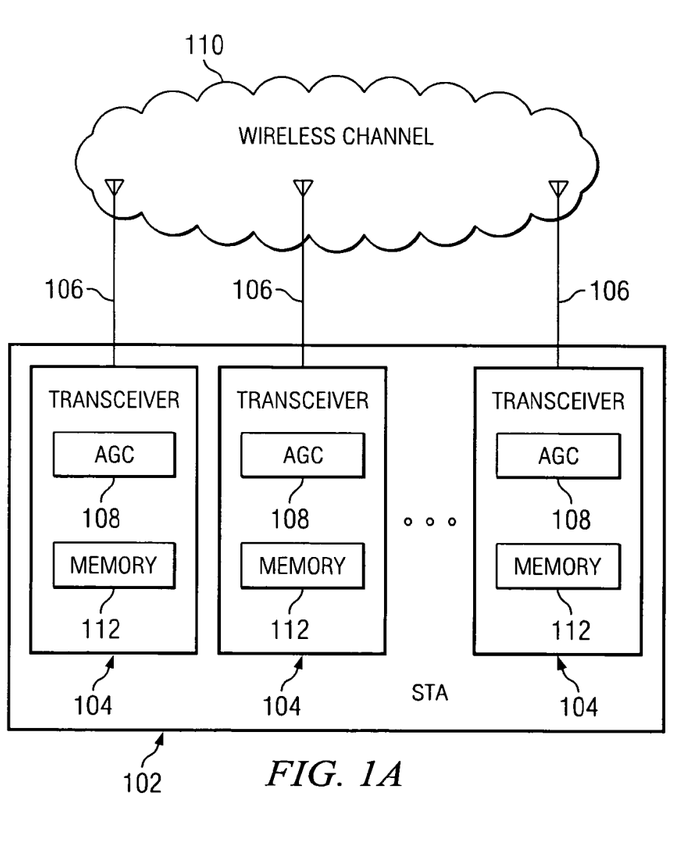
FIG. 1A illustrates a multiple-input, multiple-output signaling system block diagram in accordance with certain embodiments of the invention.

The subject matter disclosed below provides a technique for calibrating an automatic gain control ("AGC") in a MIMO system without the use of additional hardware. Referring to FIG. 1A, a MIMO STA 102 may have transceivers 104, each having an associated antenna 106. Some or all of antennas 106 may be mutually coupled to each other by way of a wireless channel 110. Each transceiver 104 may include an AGC 108 for regulating the strength of received signals. In at least one embodiment, a transceiver 104 in STA 102 may transmit a predetermined signal by way of the wireless channel 110 to the other transceivers in the STA 102. The receiving transceivers 104 may measure the magnitude and phase of signals received for each possible gain setting of the AGCs 108. The transceivers 104 may each have a memory 112 for recording these measurements for later use. In this manner, the AGCs 108 of the receiving transceivers 104 may be calibrated. The transmitting transceiver may then take a turn as a receiving transceiver while one of the calibrated transceivers transmits the predetermined signal for calibrating the AGC 108.

Figure 1B:
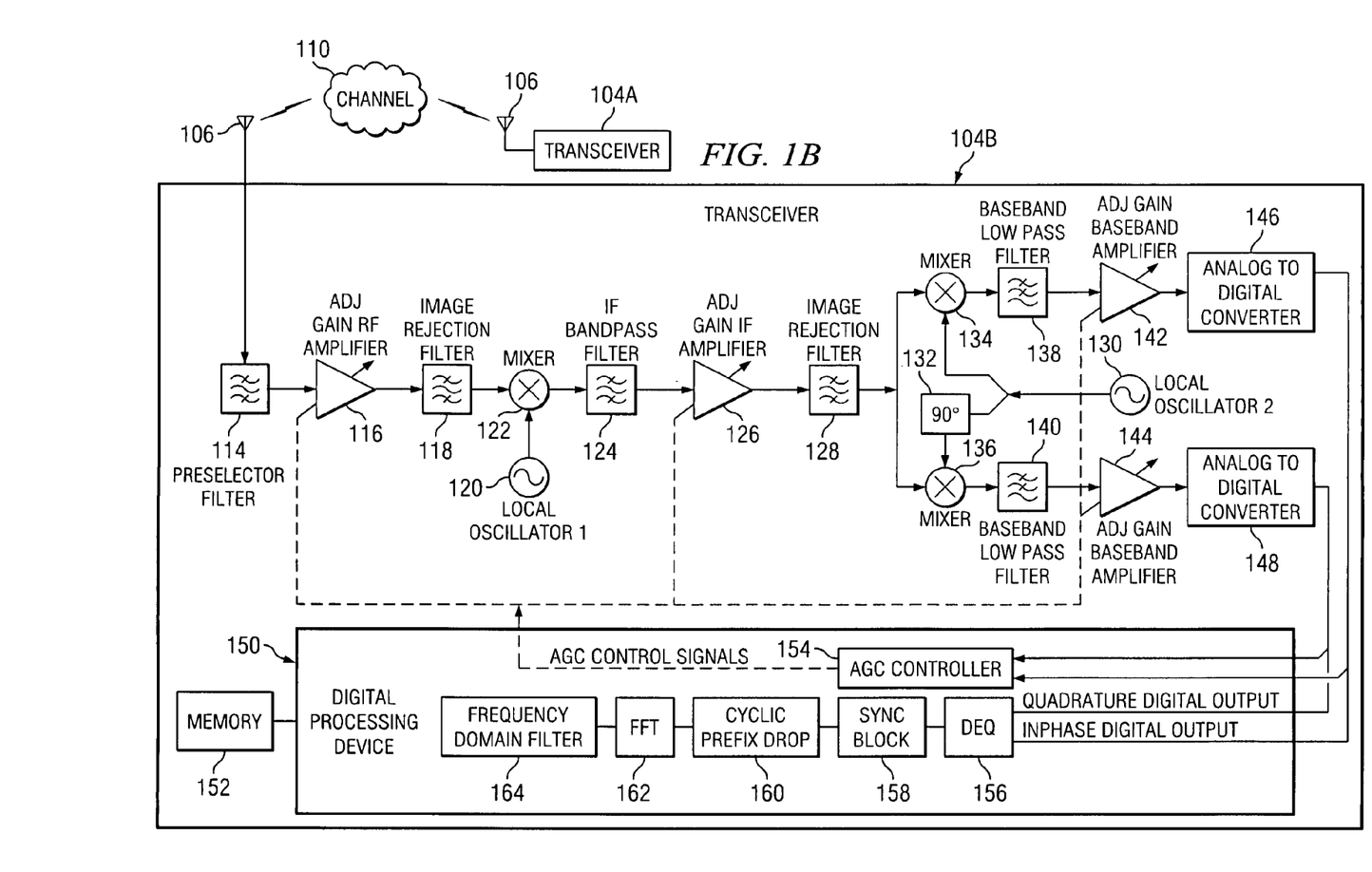
FIG. 1B illustrates a receiver block diagram in accordance with certain embodiments of the invention.

FIG. 1B is a block diagram of an illustrative STA having a transmitting transceiver 104A in communications with a receiving section of a second transceiver 104B by way of a channel 110. A receiver section of transceiver 104B may comprise, among other things, a preselector filter 114; a radio frequency amplifier 116 with adjustable gain; an image rejection filter 118; a high frequency oscillator 120; a mixer 122; an intermediate frequency bandpass filter 124; an intermediate frequency amplifier 126 with adjustable gain; a second image rejection filter 128; an intermediate frequency oscillator 130; a phase delay 132; intermediate frequency mixers 134 and 136; low pass filters 138 and 140; baseband amplifiers with adjustable gain 142 and 144; analog-to-digital converters ("ADCs") 146 and 148; a digital processing device 150; and a memory 152. The digital processing device 150 may implement an adaptive gain control 154, a digital equalizer 156, a synchronization module 158, a cyclic prefix dropping module 160, a Fast Fourier Transform ("FFT") module 162, a frequency domain filter 164, and subsequent modules for demodulating received signals.

Preselector filter 114 screens out signals outside the design range of transceiver 104B. Adjustable gain amplifiers 116, 126, 142 and 144 provide gain to the receive signal at various points in the receiver chain. Mixers 122, 134, and 136 are preceded by image rejection filters 118 and 128 to reject the image frequency bands and the noise and interference present therein. Mixers 122, 134, and 136, along with the subsequent filters 124, 138 and 140, provide frequency down-conversion, thereby shifting the carrier frequency of the receive signal first to a fixed intermediate frequency, and then to baseband. The baseband signal has both in-phase and quadrature components that are converted to digital receive signals by the ADCs 146 and 148.

The digital processing device 150 accepts the digital receive signals from the ADCs 146 and 148. The digital processing device 150 operates on the digital signals to extract the receive data. As part of its operations, the digital processing device 150 provides digital settings for the adjustable gain amplifiers 116, 126, 142, and 144. The gain settings may be determined by applying an adaptive algorithm to the digital receive signals. Alternatively, the gain settings may be set by the processing device in accordance with preprogrammed criteria. In either event, the gain settings affect the amplitude and phase of the digital receive signals in a manner that drifts over time. Gain errors of 0.1 dB or greater are common at each gain amplifier, often resulting in a cumulative receiving transceiver gain error of approximately 1 dB or greater. Adjustments to the gain settings during operation will also significantly alter the amplitude and phase of the digital receive signals. These alterations may adversely affect the performance of the digital equalizer 156 and the frequency domain filter 164. Accordingly, it is desirable to periodically measure the effects of the gain settings to permit accurate compensation in the receiver chain.

The ADCs 146 and 148 may accept as inputs a continuously varying analog data signal and a clock signal provided by any suitable entity. The ADCs 146 and 148 may sample the incoming analog data signal with each clock tick and output the sample in digital form. Provided with a continuous analog data signal, the ADCs 146 and 148 may output a stream of digital values (i.e., a "sample stream"), each value representing the voltage of the incoming analog data signal at a clock tick. These output values may be in the form of digital inphase (I) and quadrature (Q) outputs, which later may be combined to form a complex (i.e., real+j*imaginary) signal. The digital stream output by the ADCs 146 and 148 then may be processed by the digital equalizer 156 and the synchronization block 158. Any cyclic prefix that may have been prepended to the signal may be dropped at the cyclic prefix drop 160. The digital output subsequently may be converted from time domain to frequency domain by way of the fast Fourier transformer 162. The frequency domain filter 164 compensates for the attenuation and phase shift caused by the channel, but may also be used to compensate for amplitude and phase shifts caused by adjustments to the gain settings. The output from the frequency domain filter 164 can then be decoded and/or descrambled as appropriate to obtain the communicated data, which can then be provided to the intended recipient application.

The number of bits used in the digital representation of input samples may vary from one ADC to another. For example, 10-bit ADCs may divide the input voltage range into $2^{10}$ (i.e., 1024) voltage steps. Thus, each digital output from the 10-bit ADC would be the number between from 0 to 1023 that represents the binary value that most closely matches the actual input voltage. It is axiomatic that the converting an analog signal to digital samples introduces a small amount of error, i.e., the difference between the actual input voltage and the closest voltage having a binary representation. To minimize the effect of these errors, it is desirable to match the range of the analog input voltages to the maximum range of the ADC. Thus, the maximum expected analog input voltage should convert to a value near the maximum representable by the ADC, and the minimum expected analog input voltage should convert to a value near the minimum representable by the ADC. This matching causes the errors to be relatively insignificant with respect to the range of the analog signal.

In some transceiver embodiments, the data signals received by the antenna 106 may vary in amplitude from less than 10 microvolts to greater than 10 millivolts. Factors such as the distance between the transmitting and receiving antennas, physical obstructions, and signal reflections may cause the data signals to vary in strength while traveling through the channel 110. Because the ADCs 146 and 148 may require a certain signal strength for proper dynamic range matching, the receiving transceiver 104B may adjust the incoming data signal to compensate for the effects of channel 110. For example, in at least some embodiments, the ADCs 146 and 148 may require incoming analog data signals to range between −1 V and +1 V. Thus, a weak incoming data signal at a level of 10 microvolts may require a total voltage gain of 100,000. Similarly, a strong incoming data signal of 10 mV may require a lesser voltage gain of 100. The receiving transceiver 104B may apply such gains to signals, thereby providing the ADCs 146 and 148 with signals of suitable strength.

In some cases, the receiving transceiver 104B may attempt to apply inappropriate gains to certain incoming data signals. For example, the receiving transceiver 104B may attempt to apply a gain of 100,000 to a strong, incoming data signal, providing a signal size exceeding the limits of internal hardware components or the ADCs 146 and 148 and resulting in severe signal distortion. Similarly, the receiving transceiver 104B may inappropriately attempt to apply a gain of 100 to a weak, incoming data signal, resulting in a signal size too small to be properly converted to digital form by the ADCs 146 and 148. The AGC controller 154 may correct for such a problem by adjusting the receiving transceiver 104B gain, thereby keeping the data signal input into the ADCs 146 and 148 at an appropriate size.

The AGC controller 154 may be implemented as a hardwired circuit, firmware, or a software routine. In some embodiments of the adjustable gain amplifiers 116, 126, 142, 144, the gain may be adjusted digitally through the action of switches that route the receive signal through one of various available paths. The different paths may have different gains or attenuation, thus providing the adjustable gain. In other embodiments, the digital gain setting may be converted into an analog voltage to be applied to the gain control input of the adjustable gain amplifiers. The AGC controller 154 may determine appropriate gain settings by applying a control algorithm to the in-phase and quadrature phase digital receive signals. The AGC controller 154 may also receive commands from the processor 150 to set the gain settings to fixed values or to increment/decrement the gain settings.

In one embodiment, signals may be transmitted using the orthogonal frequency division multiplexing ("OFDM") modulation. OFDM is a modulation technique for transmitting large amounts of digital data over a radio wave. OFDM uses the computational efficiency of the fast Fourier transform ("FFT") and inverse fast Fourier transform ("IFFT") to transmit multiple channels of data without self-interference. OFDM works by splitting the radio signal into multiple sub-signals. Each sub-signal may be represented as a frequency coefficient. The frequency coefficients are supplied to an inverse fast Fourier transformer, wherein bits of transmission data are distributed among the sub-signals, depending on the signal-to-noise ratio of each sub-signal. The transmission data then is transmitted simultaneously at different frequencies to the receiver. OFDM reduces the amount of interference in signal transmissions and is used in 802.11a WLAN technology.

Figure 2:
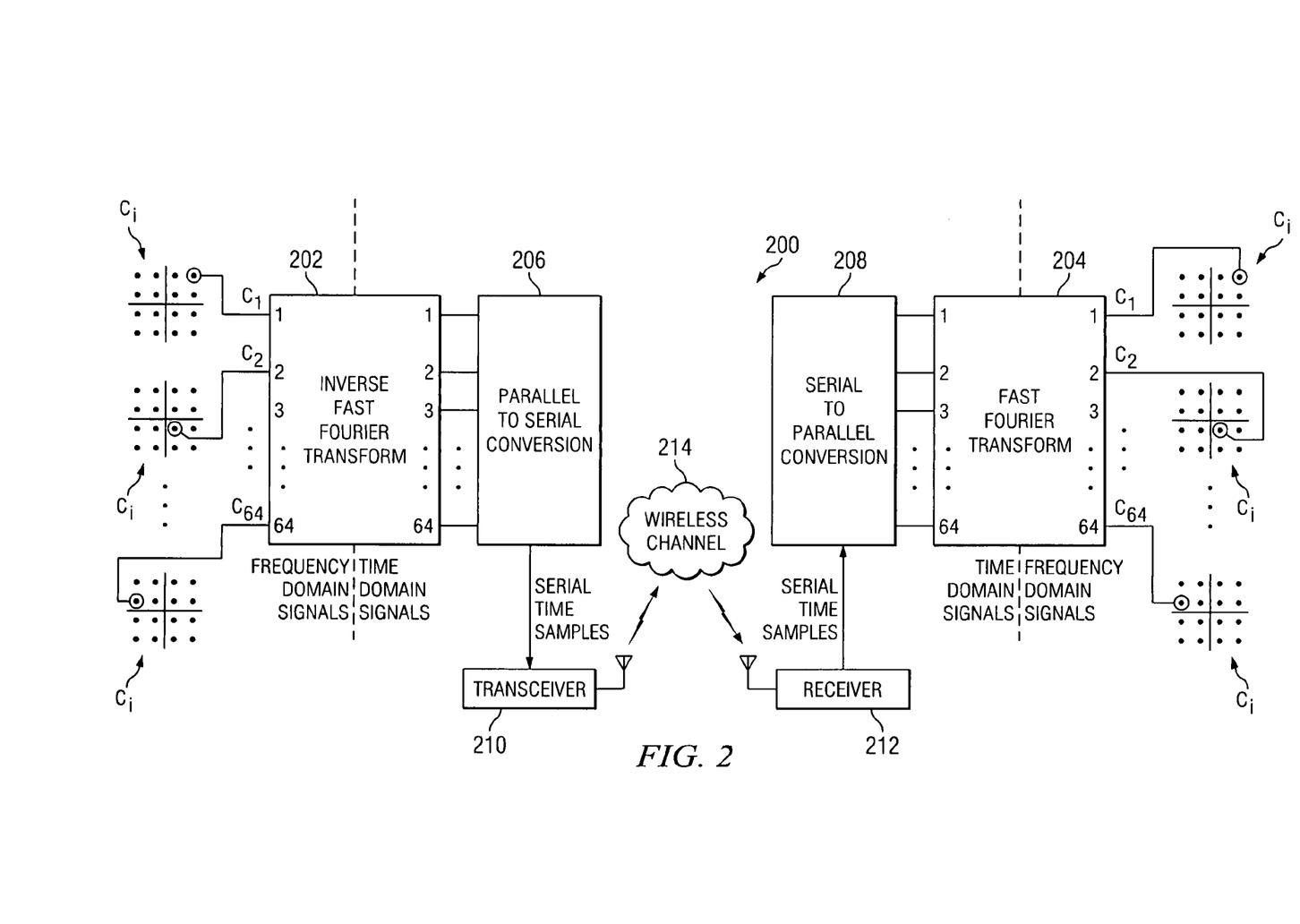
FIG. 2 illustrates a block diagram of the orthogonal frequency division multiplexing technique in accordance with certain embodiments of the invention.

FIG. 2 illustrates a block diagram of an OFDM system 200 in which a transmitter 210 is in communications with a receiver 212 by way of a wireless channel 214. The transmitter 210 is coupled to a parallel-to-series converter ("PSC") 206, which in turn is coupled to an Inverse Fast Fourier Transformer ("IFFT") 202. Conversely, the receiver 212 is coupled to a serial-to-parallel converter ("SPC") 208, which in turn is coupled to a Fast Fourier Transformer ("FFT") 204. The constellations $C_i$, are visual representations of the possible complex frequency coefficients that may be supplied to the IFFT 202 and received from the FFT 204. In FIG. 2, each constellation point represents a corresponding 4-bit data value.

The OFDM method provides the IFFT 202 with sets of complex data values from various signal constellations $C_i$. The IFFT 202 subsequently transforms the sets from the frequency domain to the time domain. Once in the time domain, data values are converted from parallel format to serial format by PSC 206, effectively creating a single stream of data to be transmitted from transmitter 210 to receiver 212 by way of channel 214. Once received by receiver 212, the data is converted from serial format back to parallel format by SPC 208, converted from time domain back to frequency domain by FFT 204 and then provided to data constellations $C_i$ as constellation data points.

A predetermined training signal is transmitted over channel 214 to allow the receiver to estimate the frequency response and phase shift added to data signals by the channel 214. The training signal is sent from transmitter 210 to receiver 212. The receiver 212 then may measure the incoming training signal and determine the frequency response and phase shift provided by the channel 214. The frequency response and phase shift information then may be used to correct channel errors in actual data signals (i.e., signals carrying data unknown to the receiver 212). In one example, a constellation point C7, when transmitted from transmitter 210, is 1<45° (magnitude of one at an angle of forty-five degrees). When received at receiver 212, however, the constellation point is 0.25<−90°. The receiver 212 may compare the received constellation point value to the original constellation point value and determine the frequency response and phase shift provided by the channel 214. In the present example, the channel 214 attenuated the data signal by a factor of 4 and shifted the phase of the signal by −135°. Similar channel estimation data may be determined for each frequency coefficient. After the training signal, an actual data signal may be transmitted by transmitter 210 over channel 214. In order to recover the data at the receiver 214, the C7 value output by the FFT 204 is multiplied by 4 and phase shifted 135°. Thus, the undesirable effects of channel 214 on the data signal are negated.

Because changing the gain of the receiver causes changes in the magnitude and phase of the received signals, it is undesirable to change the gain settings of the receiver 212 between the transmission of the channel estimation information and the transmission of the actual data signal. Thus, the AGC controller 154 may set the amplifier 116, 126, 142, 144 AGC values before the training signal and hold them unchanged throughout the channel estimation and data transmission process.

However, in some cases, normal OFDM operation may not be used. That is, the amplifiers 116, 126, 142 and 144 of FIG. 1B may be adjusted during operation by the digital processing device ("processor") 150 through the AGC controller 154. As mentioned above, such adjustments introduce amplitude and phase changes to the digital receive signals, which may cause errors if no corrective action is taken in the processor 150.

Figure 3:
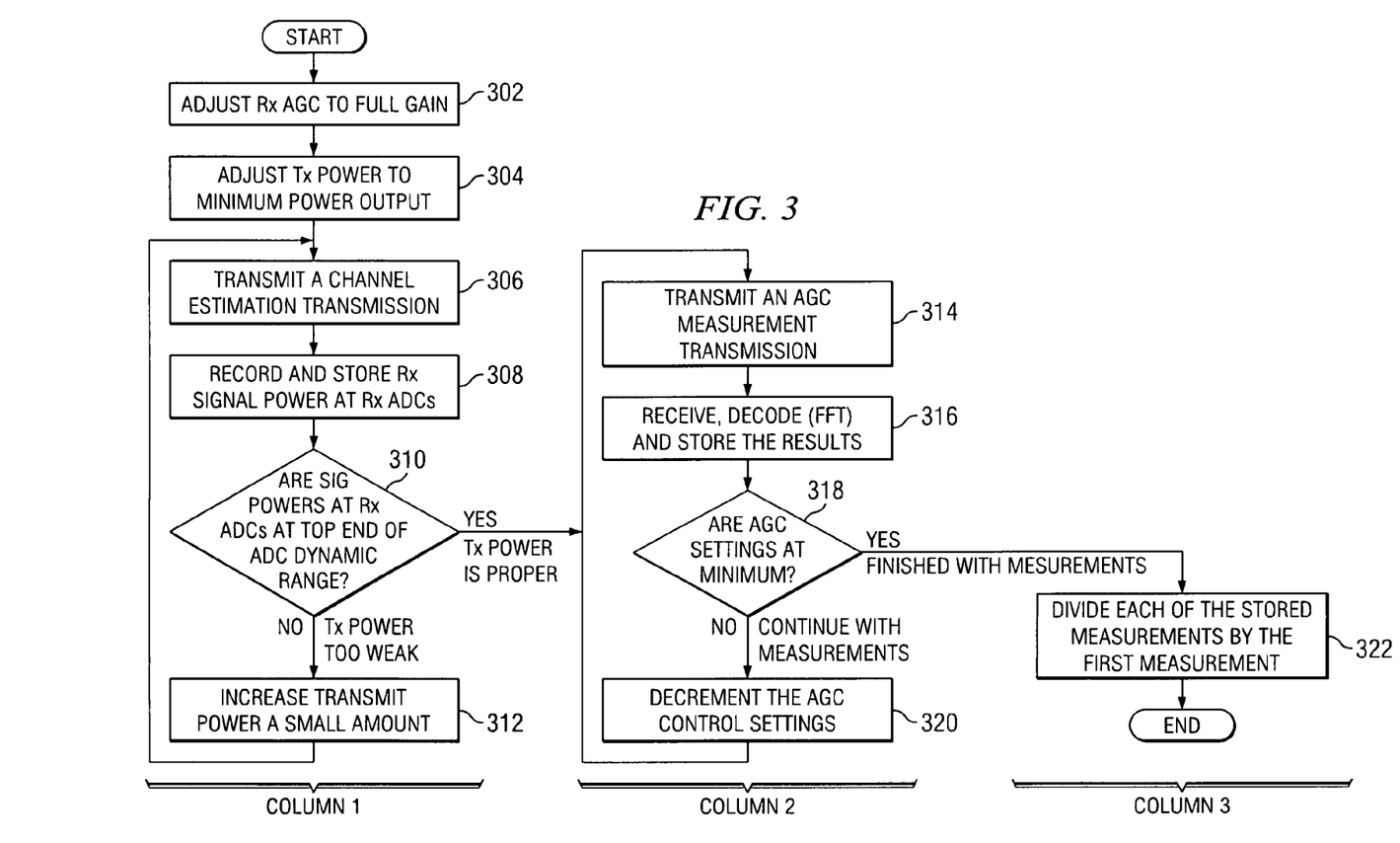
FIG. 3 illustrates a flow diagram in accordance with certain embodiments of the invention.

Referring now to FIGS. 1B and 3, FIG. 3 provides a flow chart of an illustrative AGC 108 calibration technique. The flow chart is divided into three columns, each of which will be discussed in turn. Events described in column 1 properly set the transmission power of the transmitting transceiver 104A of FIG. 1B. The process may begin with the processor 150 adjusting the gain setting to the maximum value (block 302). The transmitting transceiver 104A may adjust the transmission power to the minimum power setting (block 304). In blocks 306-312, the transmitting transceiver 104A then increments the transmission power until the processor 150 determines that the signal power at the ADCs 146 and 148 is at the top of the ADC 146 and 148 dynamic signal power range. Specifically, the transmitting transceiver 104A may transmit a predetermined training signal as previously described (block 306). The receiving transceiver 104B subsequently may receive, measure and store in memory 152 a power value for the digital receive signals (block 308). The receiving transceiver 104B then may determine whether the signal power at the ADCs 146 and 148 is at the top of the ADC 146 and 148 dynamic signal power range (block 310). If the signal power at the ADCs 146 and 148 is not at the top of the ADC range, the transmitting transceiver 104A may increase the transmission power a relatively small amount (block 312) and then may attempt another training signal transmission (block 306). However, if the signal power at the ADCs 146 and 148 is at an appropriate level, then the transmission power is set correctly and may not need to be adjusted.

If the transmission power is properly set, then the actual AGC 108 calibration process may begin. The AGC 108 calibration process may comprise an iterative loop wherein calibration measurements may be taken and stored for each possible AGC 108 gain setting. Specifically, as illustrated in column 2, the process may begin with the transmitting transceiver 104A transmitting an AGC 108 calibration transmission (block 314). The AGC 108 calibration transmission may be composed of a single frequency centered on an FFT 304 bin and may be generated by applying a single, non-zero coefficient to the IFFT 302. The receiving transceiver 104B then may receive the calibration transmission, decode the calibration transmission with the FFT 304 and store the amplitude and phase results as a complex number in memory 116 (block 316). The processor 150 may determine whether the gain setting is at the minimum level (block 318). If the AGC 108 is not set at the minimum gain level, the gain setting may be decremented by one gain level setting (block 320). The iterative AGC 108 calibration process then may continue with the transceiver 104A transmitting another calibration transmission (block 314). Otherwise, if the AGC 108 is set at the minimum gain level, the receiving transceiver 104B may have stored into memory 152 calibration measurements for each possible AGC 108 gain setting, completing the calibration loop.

Because the calibration measurement for any given AGC 108 gain setting is relative to the calibration measurement for any other gain setting, the receiving transceiver 104B may normalize all calibration measurements stored in memory 152 to the calibration measurement of the maximum AGC 108 gain setting (i.e., the first measurement). Column 3 of FIG. 3 illustrates the normalization process of dividing all stored calibration measurement values by the first calibration measurement value (block 322).

In FFT 304-based operations, a slip of a measurement sample in the time domain causes an undesirable, progressive phase shift across the frequency domain outputs. Precisely-timed measurements may prevent sample slips. Additionally, in accordance with standard OFDM practices, a relatively small cyclic prefix may be prepended to the AGC 108 calibration transmission to account for the non-zero propagation from the digital-to-analog converter ("DAC") in transceiver 104A to the ADCs 146 and 148 in the receiving transceiver 104B. The cyclic prefix subsequently may be removed by the cyclic prefix drop 160 in the receiving transceiver 104B.

In the embodiments described above, as the gain setting of the AGC 108 is decremented, the strength of the signals provided to the ADCs 146 and 148 decreases. While tolerable for a relatively small range of AGC 108 gain settings, the processor 150 may eventually attenuate the signals such that the ADCs 146 and 148 may no longer be capable of performing measurements with sufficient accuracy.

An alternative embodiment addresses this problem by decrementing the gain settings of the AGC 108 over a small range of gain in k decrements while taking measurements at each gain setting. After k decrements, the transmission power may be incremented by L dB, an amount sufficient to restore the strength of signals provided to the ADCs 146 and 148. The value of L may be determined by measurement or design of the transceiver 104B. The process of k AGC 108 decrements followed by a restoring transmit power increment may continue in this fashion until the entire calibration process is complete. However, adjusting the transmission power may introduce changes in subsequent calibration measurements, so care should be taken to compensate the calibration measurements for the transmission power adjustments.

To compensate for adjusting the transmission power, the $k^{th}$ calibration measurements may be performed twice. The first $k^{th}$ calibration measurement, resulting in the complex calibration value $c_{k,1}$, may be performed immediately prior to increasing the transmission power. The second $k^{th}$ calibration measurement, resulting in complex calibration value $c_{k,2}$, may be performed immediately after increasing the transmission power. For example, if k=10, then the tenth calibration measurement may be performed twice. The first measurement may be performed immediately prior to increasing the transmission power and the second measurement may be performed immediately after increasing the transmission power. After the increase in transmission power, further AGC 108 calibration measurements may be compensated for the transmit power increase. In this example, these would be the $11^{th}$ and succeeding measurements.

The complex correction factor $f_k$ needed to compensate for the increase in transmit power then may be determined by dividing the first measurement by the second measurement. That is, $$f_k = \frac{c_{k,1}}{c_{k,2}}.$$

Thus, for succeeding AGC 108 calibration measurements, each measured value may be multiplied by the correction factor $f_k$ to compensate for the transmission power adjustment. That is, $$c'_i = c_i \cdot f_k \text{ for all } i > k,$$

where $c'_i$ is the corrected complex calibration measurement and $c_i$ is the raw complex calibration measurement.

Continuing with this example, k=10 denotes that the transmission power is increased after every $10^{th}$ AGC 108 gain decrement. To compensate the subsequent measured values for the transmit power increases, each measured value may be multiplied by the product of the correction factors. That is, $$c'_i = \begin{cases} c_i f_{10} & \text{for } 10 < i \leq 20 \\ c_i f_{10} f_{20} & \text{for } 20 < i \leq 30 \\ c_i f_{10} f_{20} f_{30} & \text{for } 30 < i \leq 40 \\ \text{etc.} & \end{cases}.$$

However, instead of multiplying each raw measurement for the AGC 108 gain settings by perhaps multiple correction factors ($f_{10} \cdot f_{20} \ldots$), a more practical approach comprises multiplying the appropriate factors together, thereby forming a combined correction factor g. That is, $$g = f_{10} f_{20} \ldots.$$

Thus, each raw measurement value may be multiplied only by a single correction factor g, which is updated at each $k^{th}$ step by being multiplied with a new correction factor $f_k$.

Figure 4:
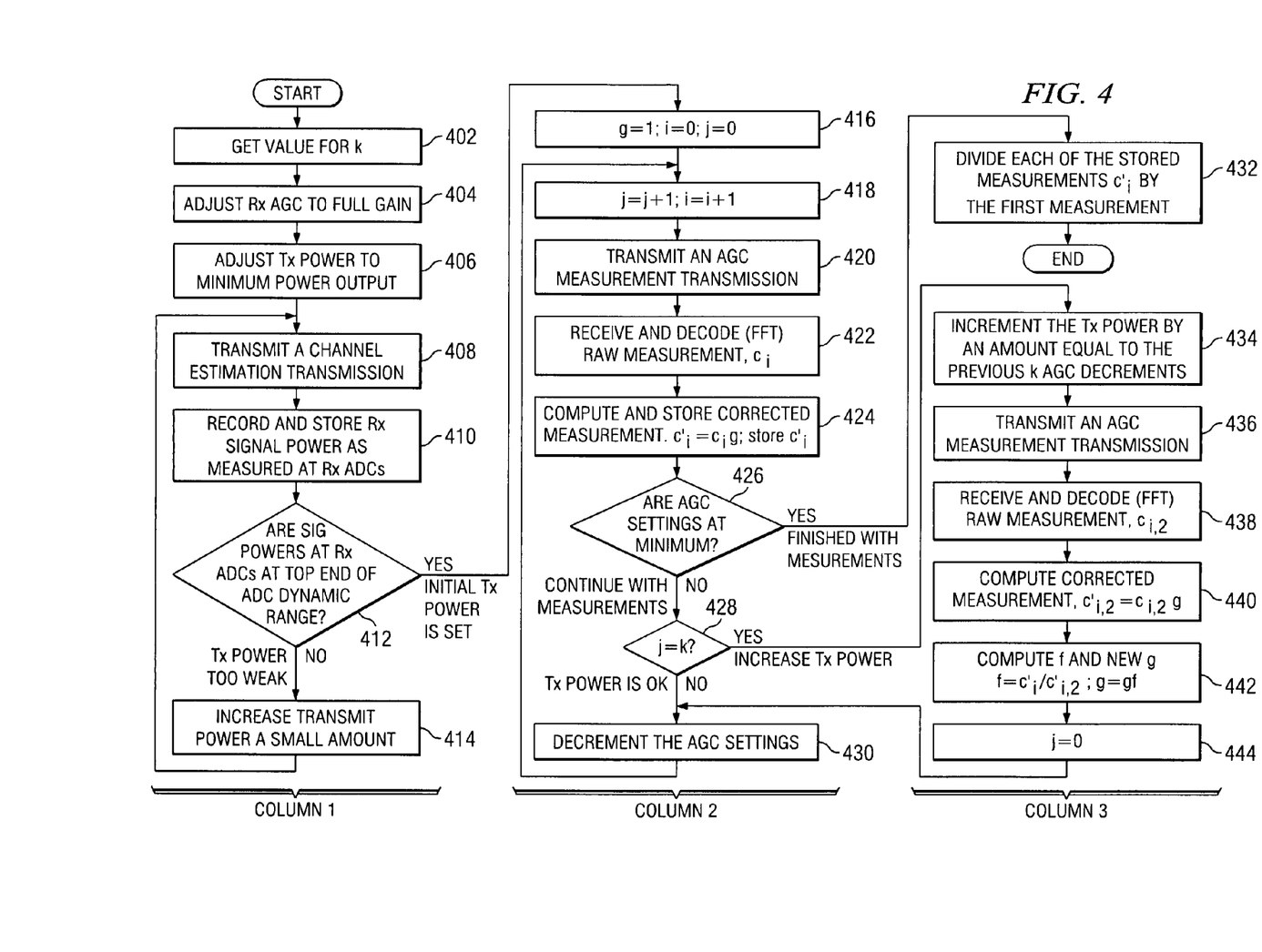
FIG. 4 illustrates a second flow diagram in accordance with certain embodiments of the invention.

Divided into three columns, FIG. 4 illustrates the algorithm comprised by the alternative embodiment. Column 1 illustrates the setting of the initial transmission power prior to initializing AGC 108 calibration. Column 2 describes the AGC 108 calibration process and determines whether there exists a need to increase transmission power. The upper portion of column 3 represents the normalization of the stored values by the initial calibration measurements. The lower portion of column 3 illustrates the algorithm for increasing transmission power. Each column will now be discussed in turn.

The process may begin in column 1 by obtaining a value for k (block 402). The k value, denoting the number of times the AGC 108 gain setting is decremented, after which the transmission power is increased, may be provided by the device manufacturer, an end-user, or any other suitable entity. The processor 150 may adjust the gain setting to the maximum gain setting (block 404). The transmitting transceiver 104A may adjust the transmission power to the minimum power setting (block 406). In blocks 408-414, the transmitting transceiver 104A then increments the transmission power until the processor 150 determines that the signal power at the ADCs 146 and 148 is at the top of the ADC dynamic signal power range. Specifically, the transmitting transceiver 104A may transmit a predetermined training transmission as described above (block 408). The receiving transceiver 104B subsequently may receive, measure and store the channel estimation transmission (block 410). The receiving transceiver 104B then may determine whether the signal power at the ADCs 146 and 148 is at the top of the ADC 146 and 148 dynamic signal power range; that is, the receiving transceiver 104B may determine whether the signal power at the ADCs is above a predetermined threshold (block 412). If the signal power at the ADCs 146 and 148 is not at a suitable level, the transmitting transceiver 104B may increase the transmission power a relatively small amount (block 414) and then may transmit another training signal transmission (block 408). Otherwise, if the signal power at the ADCs 146 and 148 is at an appropriate level, then the transmission power is set correctly and may not need to be adjusted.

If the transmission power is properly set, then the actual AGC calibration process may begin. The AGC calibration process, illustrated in column 2, may begin by initializing variables g=1, i=0 and j=0 (block 416). As described above, g represents the combined correction factors, i represents the number of overall AGC gain settings decremented throughout the entire calibration process, and j represents the number of AGC 108 gain settings decremented in the current range of k gain settings. Counters i and j then may be incremented by 1 (block 418), starting an iterative AGC calibration loop. The transmitting transceiver 104A may transmit an AGC calibration signal (block 420) and the receiving transceiver 104B may receive and decode the raw measurement (block 422). The raw measurement may be taken from the output of the FFT module. The receiving transceiver 104B then may multiply the raw measurement value by the combined correction factor g to produce and store a corrected measurement value (block 424).

The receiving transceiver 104B may determine whether AGC 108 gain settings are at the minimum possible level, indicating that the calibration process is complete (block 426). If the AGC 108 gain settings are not at the minimum level, the receiving transceiver 104B may compare j and k values to determine whether the current range of k gain settings has been passed. For example, if k=10 and j=4, the current range of 10 gain settings has not been passed, indicating that the transmission power is at a suitable level. The receiving transceiver 104B may decrement the AGC 108 gain setting (block 430) and proceed to repeat the iterative loop by incrementing j and i (block 418). However, if j and k values are equal, indicating that the current range of k gain settings has expired, the transmission power is insufficient to continue the calibration and must be increased, as explained below.

If the AGC 108 gain settings are at the minimum possible level as determined by the receiving transceiver 104B (block 426), the AGC calibration loop is complete. The receiving transceiver 104B may normalize the stored measurements by dividing each measurement by the first measurement (block 432).

Column 3 illustrates the algorithm for increasing transmission power. As described above, control is passed from column 2 to column 3 if k gain settings have passed and there exists a need to increase transmission power. The process may begin by incrementing the transmission power by an amount equal to the previous k AGC gain setting decrements (block 434). For example, if after k decrements the AGC gain has been reduced by 8 dB, then the transmission power may be incremented by L=8 dB. Likewise, if k decrements result in an AGC gain reduction of 20 dB, then the transmission power may be incremented by L=20 dB. The transmitting transceiver 104A then may transmit an AGC calibration signal (block 436) and the receiving transceiver 104B may receive and decode the raw measurement (block 438). The receiving transceiver 104B may compute the corrected measurement by multiplying the raw measurement and the correction factor (block 440). The receiving transceiver 104B subsequently may compare the measurement values immediately before and immediately after the transmission power adjustment to determine a correction factor f and a combined correction factor g (block 442), as previously described. Once j is reset to 0 in order to keep track of the number of gain settings decremented within a range of k gain settings (block 444), the algorithm returns control to the calibration process of column 2 by decrementing the AGC gain setting (block 430) and repeating the calibration process for the decremented AGC gain setting.

As the AGC gain setting is decremented in the previous embodiment, the combined correction factor g substantially increases. That is, as the AGC 108 approaches the lowest gain settings, g comprises several correction factors f. Thus, as the AGC 108 approaches the lowest gain settings, the algorithm is increasingly susceptible to larger errors. To compensate for such a problem, a third embodiment calibrates the AGC 108 by beginning measurements midway through the AGC 108 gain setting range instead of beginning measurements at the top of the AGC 108 gain setting range. The third embodiment comprises a process that decrements the AGC 108 gain setting for half of the gain setting range, resets the gain setting to the midpoint, and increments the AGC 108 gain setting for the remaining half of the gain setting range.

In an example, an illustrative AGC 108 has a range of 80 dB with a midpoint value of −40 dB, a step size of 1 dB and a transmission power increase every 10 dB (k=10 steps, L=10 dB). Instead of beginning at 0 dB and stepping down to −80 dB as in previous embodiments, this process begins at −40 dB and steps down a total of 40 dB, with transmission power increases every 10 dB. Upon completion, the process will have changed transmission power only three times, thereby supplying only three f correction factors and minimizing the accumulation of error in g. To measure the remaining half of the 80 dB range, the AGC 108 may be returned to the −40 dB mark and the gain settings may be incremented a total of 40 dB, decrementing the transmit power every 10 dB. This algorithm minimizes the number of f correction factors involved in converting raw measurement data to corrected measurement data and thus minimizes error.

Although the foregoing embodiments are discussed in the context of linear, equal steps, non-linear or unequal steps also may be accommodated. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for calibrating an AGC in a MIMO-based system, the method comprising:
   transmitting a calibration signal;
   receiving the calibration signal;
   decoding the calibration signal to produce a measurement;
   storing the measurement;
   changing an AGC gain setting; and
   repeating the transmitting, receiving, decoding, storing, and changing operations to determine an optimal AGC gain setting.

2. The method of claim 1, wherein the transmitting, receiving, decoding, storing, and changing operations are performed by a single multiple-input-multiple-output (MIMO) wireless device.

3. The method of claim 1, wherein the transmitting, receiving, decoding, storing, and changing operations are performed for each AGC gain setting.

4. The method of claim 1, wherein transmitting said calibration signal comprises transmitting a single frequency centered on a fast Fourier transformer bin.

5. The method of claim 1, further comprising generating said calibration signal by applying a non-zero coefficient to an inverse fast Fourier transformer.

6. The method of claim 1, wherein decoding the calibration signal comprises using a fast Fourier transformer.

7. The method of claim 1, further comprising accessing the measurement to improve AGC performance.

8. The method of claim 1, further comprising normalizing the measurement.

9. The method of claim 1, wherein transmitting said calibration signal comprises prepending a cyclic prefix to the calibration signal.

10. A Multiple Input Multiple Output (MIMO)-based system, comprising:
    an adjustable gain amplifier that receives a wireless transmission comprising a calibration signal; and
    a digital processing device that comprises an automatic gain control (AGC) coupled to the adjustable gain amplifier, the AGC controls a gain of the adjustable gain amplifier;
    wherein the AGC iteratively changes the gain of the adjustable gain amplifier to each of a plurality of gain settings; and
    wherein the digital processing logic iteratively decodes the calibration signal for each of the plurality of gain settings to produce a plurality of measurements that are stored and used to identify a target AGC gain setting.

11. The MIMO-based system of claim 10, wherein the calibration signal comprises a single frequency centered on a fast Fourier transformer bin.

12. The MIMO-based system of claim 10, further comprising a transmitter that generates the calibration signal.

13. The MIMO-based system of claim 12, wherein the calibration signal is generated by applying a non-zero coefficient to an inverse fast Fourier transformer.

14. The MIMO-based system of claim 10, wherein the digital processing logic decodes the calibration signal using a fast Fourier transformer.

15. The MIMO-based system of claim 10, wherein the digital processing logic further accesses the plurality of measurements to improve AGC performance.

16. The MIMO-based system of claim 10, wherein the digital processing logic further normalizes the plurality of measurements.

17. The MIMO-based system of claim 10, wherein the calibration signal comprises a prepended cyclic prefix.

18. A Multiple Input Multiple Output (MIMO)-based system, comprising:
    means for receiving a calibration signal;
    means for decoding the calibration signal to produce a plurality of measurements, and for processing the produced plurality of measurements; and
    means for changing a gain of the means for receiving;
    wherein the means for changing iteratively changes the gain of the means for receiving to each of a plurality of gain settings; and
    wherein the means for decoding and for processing decodes the calibration signal for each of the plurality of gain settings to produce the plurality of measurements that are used to identify a desired gain setting.

19. The MIMO-based system of claim 18, further comprising means for transmitting the calibration signal.

20. The MIMO-based system of claim 18, further comprising means for storing the measurement.

21. The MIMO-based system of claim 18, wherein the means for decoding and for processing decodes the calibration signal using a fast Fourier transformer.

22. The MIMO-based system of claim 18, wherein the means for decoding and for processing further accesses the plurality of measurements to improve AGC performance.

23. The MIMO-based system of claim 18, wherein the means for decoding and for processing further normalizes the plurality of measurements.

* * * * *